US009167047B1

(12) United States Patent
Sharma et al.

(10) Patent No.: US 9,167,047 B1
(45) Date of Patent: Oct. 20, 2015

(54) SYSTEM AND METHOD FOR USING POLICIES TO SUPPORT SESSION RECORDING FOR USER ACCOUNT MANAGEMENT IN A COMPUTING ENVIRONMENT

(71) Applicant: Oracle International Corporation, Redwood Shores, CA (US)

(72) Inventors: Himanshu Sharma, Redwood Shores, CA (US); Sudhir Kumar Srinivasan, San Jose, CA (US); Ramaprakash Sathyanarayan, Redwood Shores, CA (US); Arun Samipillaipudur Theebaprakasam, Fremont, CA (US); Kuang-Yu Shih, Fremont, CA (US); Fannie Ho, Fremont, CA (US); Zhuoxing Mao, Redwood Shores, CA (US); Olaf Stullich, Morgan Hill, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/494,732

(22) Filed: Sep. 24, 2014

(51) Int. Cl.
*G06F 15/16* (2006.01)
*H04L 29/08* (2006.01)
*H04L 12/26* (2006.01)

(52) U.S. Cl.
CPC ............ *H04L 67/22* (2013.01); *H04L 43/10* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 5,852,436 A | 12/1998 | Franklin et al. | |
| 7,613,290 B2 | 11/2009 | Williams et al. | |
| 7,620,895 B2 | 11/2009 | Adkins et al. | |
| 7,627,821 B2 * | 12/2009 | Klementiev | 715/704 |
| 7,673,340 B1 | 3/2010 | Cohen et al. | |
| 2002/0038388 A1 | 3/2002 | Netter | |
| 2002/0106190 A1 | 8/2002 | Nygren et al. | |
| 2005/0216527 A1 | 9/2005 | Erlingsson | |
| 2007/0083821 A1 | 4/2007 | Garbow et al. | |
| 2007/0101353 A1 | 5/2007 | Jeong et al. | |
| 2007/0124476 A1 | 5/2007 | Oesterreicher et al. | |
| 2007/0130292 A1 | 6/2007 | Tzruya et al. | |
| 2007/0136235 A1 | 6/2007 | Hess | |
| 2007/0191966 A1 | 8/2007 | Fisher et al. | |
| 2007/0300161 A1 | 12/2007 | Bhatia et al. | |
| 2007/0300179 A1 * | 12/2007 | Friedlander | 715/781 |

(Continued)

OTHER PUBLICATIONS

© STEPOK IMAGE LAB. 2007-2013, Screen Anytime v4.5 Administrator Manual, Document version v4.5, Jun. 20, 2013, 25 pages.

(Continued)

*Primary Examiner* — Thomas Dailey
(74) *Attorney, Agent, or Firm* — Tucker Ellis LLP

(57) ABSTRACT

A system and method can support user account management in a computing environment. A user account manager can configure one or more recording policies, wherein said one or more recording policies operates to define detailed information on how user activities on a target system should be recorded. Furthermore, the user account manager can provide said one or more recording policies to one or more visual session recording processes associated with the target system. Then, the user account manager can use said one or more visual session recording processes to record activities in a user session on the target system based on said one or more recording policies.

26 Claims, 6 Drawing Sheets

(56) References Cited

U.S. PATENT DOCUMENTS

| | | | |
|---|---|---|---|
| 2008/0084470 | A1 | 4/2008 | Hamilton |
| 2008/0098101 | A1 | 4/2008 | Black et al. |
| 2008/0222532 | A1 | 9/2008 | Mester et al. |
| 2009/0254960 | A1 | 10/2009 | Yarom et al. |
| 2011/0023115 | A1* | 1/2011 | Wright ............................ 726/22 |
| 2011/0184982 | A1 | 7/2011 | Adamousky et al. |
| 2011/0276685 | A1 | 11/2011 | de Waal et al. |
| 2011/0288931 | A1 | 11/2011 | Kuhn et al. |
| 2011/0296001 | A1 | 12/2011 | Ramstrom |
| 2012/0131456 | A1 | 5/2012 | Lin et al. |
| 2012/0159324 | A1 | 6/2012 | Chavez et al. |
| 2013/0083843 | A1 | 4/2013 | Bennett |
| 2013/0083923 | A1 | 4/2013 | Soo et al. |
| 2013/0097626 | A1 | 4/2013 | Rajagopal et al. |
| 2013/0332987 | A1* | 12/2013 | Tenneti et al. .................... 726/1 |
| 2014/0057238 | A1 | 2/2014 | Okamoto et al. |
| 2014/0149496 | A1 | 5/2014 | Lee et al. |

OTHER PUBLICATIONS

RecordTS Installation Guide version 2.0, TSFactory LLC. © 2005-2010, updated May 1, 2010, 21 pages.

SoftActivity TS Monitor 3.5—software for Windows Terminal Server monitoring, © 2000-2014, Deep Software Inc., retrieved from: <http://www.softactivity.com/tsm.aspx>, Aug. 20, 2014, 5 pages.

CensorNet Desktop Surveillance from © 2005-2013 Censornet Ltd. retrieved from: <http://www.censornet.com/en/products/desktopsurveillance>, Aug. 20, 2014, 2 pages.

CensorNet Desktop Surveillance Product Features of Desktop Surveillance from © 2005-2013 Censornet Ltd., retrieved from: <http://www.censornet.com/en/products/desktopsurveillance/features>, Aug. 20, 2014, 1 page.

Shin-Hung Chang et al., "SGA: A Sporadic GDI Adapter for Smooth Motion Recording on Computer Screen" (Abstract), published in: Embedded and Ubiquitous Computing (EUC), 2011 IFIP 9$^{th}$ International Conference on Oct. 24-26, 2011, retrieved from: <http://ieeexplore.ieee.org/xpl/articleDetails.jsp?tp=&arnumber=6104537>, Aug. 20, 2014, 2 pages.

T. Sasaki et al., "An Exploratory Study on the Impact of Usage of Screenshot in Software Inspection Recording Activity", Published in: Software Measurement, 2011 Joint Conference of the 21$^{st}$ Int'l Workshop on and 6$^{th}$ Int'l Conference on Software Process and Product Measurement (IWSM-MENSURA) on Nov. 3-4, 2011, retrieved from: <http://ieeexplore.ieee.org/xpl/articleDetails.jsp?tp=&arnumber=6113068>, Aug. 20, 2014, 2 pages.

J.J. Schultz et al., "An efficient scheme for chaining with client-centric buffer reservation for multi-media streaming", Published in: Simulation Symposium, 2003, 36$^{th}$ Annual: Date of Conference: Mar. 30-Apr. 2, 2003, retrieved from <http://ieeexplore.ieee.org/xpl/articleDetails.jsp?tp=&arnumber=1192795>, Aug. 20, 2014, 2 pages.

Cybele Software, ThinRDP, © 2011-2014 by Cybele Software Inc., retrieved from: <http://www.cybelesoft.com/thinrdp/>, Aug. 20, 2014, 2 pages.

ObserveIT, ObserveIT Enterprise for User Activity Monitoring: Get Compliant with Citrix, SSH and RDP Recording, retrieved from <http://www.observeit.com/Products>, Aug. 20, 2014, 2 pages.

ObserveIT, Record and Replay Windows Sessions, retrieved from <http://www.observeit.com/Products/Features/Windows>, Aug. 20, 2014, 2 pages.

ObserveIT, Video Activity Analysis of Every Recorded Session, retrieved from <http://www.observeit.com/Products/Features/Video-Activity-Analysis>, Aug. 20, 2014, 2 pages.

Wallix Adminbastion (WAB), retrieved from <http://www.wallix.com/images/Plaquettes/datasheetwabV4EN.pdf>, Aug. 21, 2014, 4 pages.

Remotespark, HTML5 Solution—one ultimate solution for all OS and devices, retrieved from <http://www.remotespark.com/html5.html>, Aug. 21, 2014, 4 pages.

CyberArk, Ensure the controls are in place to centrally secure, manage and monitor privileged accounts, retrieved from <http://www.cyberark.com/solution-detail/control-and-accountability-privileged-users-solutions#.U8ipXuOSyGM>, Aug. 21, 2014, 5 pages.

CyberArk, Control & monitor "who" can initiate and "what" can be done in privileged sessions, retrieved from <http://www.cyberark.com/solution-detail/monitor-record-privileged-activity-solutions#.U8ipxOOSyGM >, Aug. 21, 2014, 4 pages.

CyberArk, Ensure that remote access is secure, controlled and monitored, retrieved from <http://www.cyberark.com/solution-detail/remote-access-control-solutions#.U8iyOeOSyGM>, Aug. 21, 2014, 4 pages.

Hitachi ID Systems, Inc., Hitachi ID Privileged Access Manager, © Hitachi ID Systems, Inc. 2014, retrieved from <http://hitachi-id.com/privileged-access-manager/>, Aug. 21, 2014, 1 page.

Hitachi ID Systems, Inc., Hitachi ID Privileged Access Manager, © Hitachi ID Systems, Inc. 2014, retrieved from <http://hitachi-id.com/privileged-access-manager/overview/>, Aug. 21, 2014, 2 pages.

Hitachi ID Systems, Inc., Hitachi ID Privileged Access Manager, © Hitachi ID Systems, Inc. 2014, retrieved from <http://hitachi-id.com/privileged-access-manager/overview/screen-recordings.html>, Aug. 21, 2014, 3 pages.

ERICOM, PowerTerm WebConnect RemoteView, Copyright © 2014 Ericom® Software, retrieved from <http://www.ericom.com/webconnect_remoteview_features.asp>, Aug. 21, 2014, 2 pages.

ObserveIT, Customizable Recording Policies, retrieved from <http://www.observeit.com/Products/Features/Customizable-Recording-Policies>, Aug. 21, 2014, 2 pages.

ObserveIT, How ObserveIT Works: Monitoring TS, Citrix, Vmware and SSH session, retrieved from <http://www.observeit.com/Products/How_it_Works>, Aug. 21, 2014, 2 pages.

ObserveIT, Database Management, retrieved from <http://www.observeit.com/Products/Features/Database_Management>, Aug. 21, 2014, 2 pages.

ObserveIT, Threat Detection Console, retrieved from <http://www.observeit.com/Products/Features/Threat-Detection-Console>, Aug. 21, 2014, 2 pages.

ObserveIT, Advanced Keylogging Capabilities, retrieved from <http://www.observeit.com/Products/Features/Advanced-Keylogging-Capabilities>, Aug. 21, 2014, 2 pages.

ObserveIT, ObserveIT User Session Auditor Feature List, retrieved from <http://www.observeit.com/Products/Features>, Aug. 21, 2014, 4 pages.

ObserveIT, Privileged User Identification, retrieved from <http://www.observeit.com/Products/Features/Privileged_User_Identification>, Aug. 21, 2014, 2 pages.

ObserveIT, Product Integrations, retrieved from <http://www.observeit.com/Products/Integrations>, Aug. 21, 2014, 2 pages.

ObserveIT, Architecture, retrieved from <http://www.observeit.com/Products/Architecture>, Aug. 21, 2014, 2 pages.

ObserveIT, Version Comparison User Auditing Options, retrieved from <http://www.observeit.com/Products/Versions>, Aug. 26, 2014, 1 page.

ObserveIT, Managing ObserveIT Storage, retrieved from <http://www.observeit.com/products/documentation/index.htm>, Sep. 5, 2014, 2 pages.

ObserveIT, Recording Metadata Information, retrieved from <http://www.observeit.com/products/documentation/index.htm>, Sep. 5, 2014, 3 pages.

ObserveIT, Recording User Sessions, retrieved from <http://www.observeit.com/products/documentation/index.htm>, Sep. 5, 2014, 2 pages.

ObserveIT, Replaying User Sessions, retrieved from <http://www.observeit.com/products/documentation/index.htm>, Sep. 5, 2014, 2 pages.

ObserveIT, Server Diary, retrieved from <http://www.observeit.com/products/documentation/index.htm>, Sep. 5, 2014, 6 pages.

ObserveIT, Web Management Console, retrieved from <http://www.observeit.com/products/documentation/index.htm>, Sep. 5, 2014, 4 pages.

* cited by examiner

SYSTEM AND METHOD FOR USING POLICIES TO SUPPORT SESSION RECORDING FOR USER ACCOUNT MANAGEMENT IN A COMPUTING ENVIRONMENT

CROSS REFERENCE TO RELATED APPLICATIONS

This application is related to the following patent applications, each of which is hereby incorporated by reference in its entirety:

U.S. Patent Application titled "SYSTEM AND METHOD FOR OPTIMIZING VISUAL SESSION RECORDING FOR USER ACCOUNT MANAGEMENT IN A COMPUTING ENVIRONMENT", application Ser. No. 14/494,728, filed Sep. 24, 2014;

U.S. Patent Application titled "SYSTEM AND METHOD FOR SUPPORTING DYNAMIC OFFLOADING OF VIDEO PROCESING FOR USER ACCOUNT MANAGEMENT IN A COMPUTING ENVIRONMENT", application Ser. No. 14/494,737, filed Sep. 24, 2014; and U.S. Patent Application titled "SYSTEM AND METHOD FOR SUPPORTING VIDEO PROCESSING LOAD BALANCING FOR USER ACCOUNT MANAGEMENT IN A COMPUTING ENVIRONMENT", application Ser. No. 14/494,738, filed Sep. 24, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to user account management in a computing environment.

BACKGROUND

As the enterprise/cloud applications and systems become more complex, the task of preventing inappropriate access to various user accounts and the task of detecting unauthorized activities by many different users become extremely challenging. This is the general area that embodiments of the invention are intended to address.

SUMMARY

Described herein are systems and methods that can support user account management in a computing environment. A user account manager can configure one or more recording policies, wherein said one or more recording policies operates to define detailed information on how user activities on a target system should be recorded. Furthermore, the user account manager can provide said one or more recording policies to one or more visual session recording processes associated with the target system. Then, the user account manager can use said one or more visual session recording processes to record activities in a user session on the target system based on said one or more recording policies.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Oracle Privileged Account Manager (OPAM) system as an example for an account management system. It will be apparent to those skilled in the art that other types of account management system can be used without limitation.

Described herein are systems and methods that can support user account management in a computing environment.

Privileged Account Manager

Figure 1:
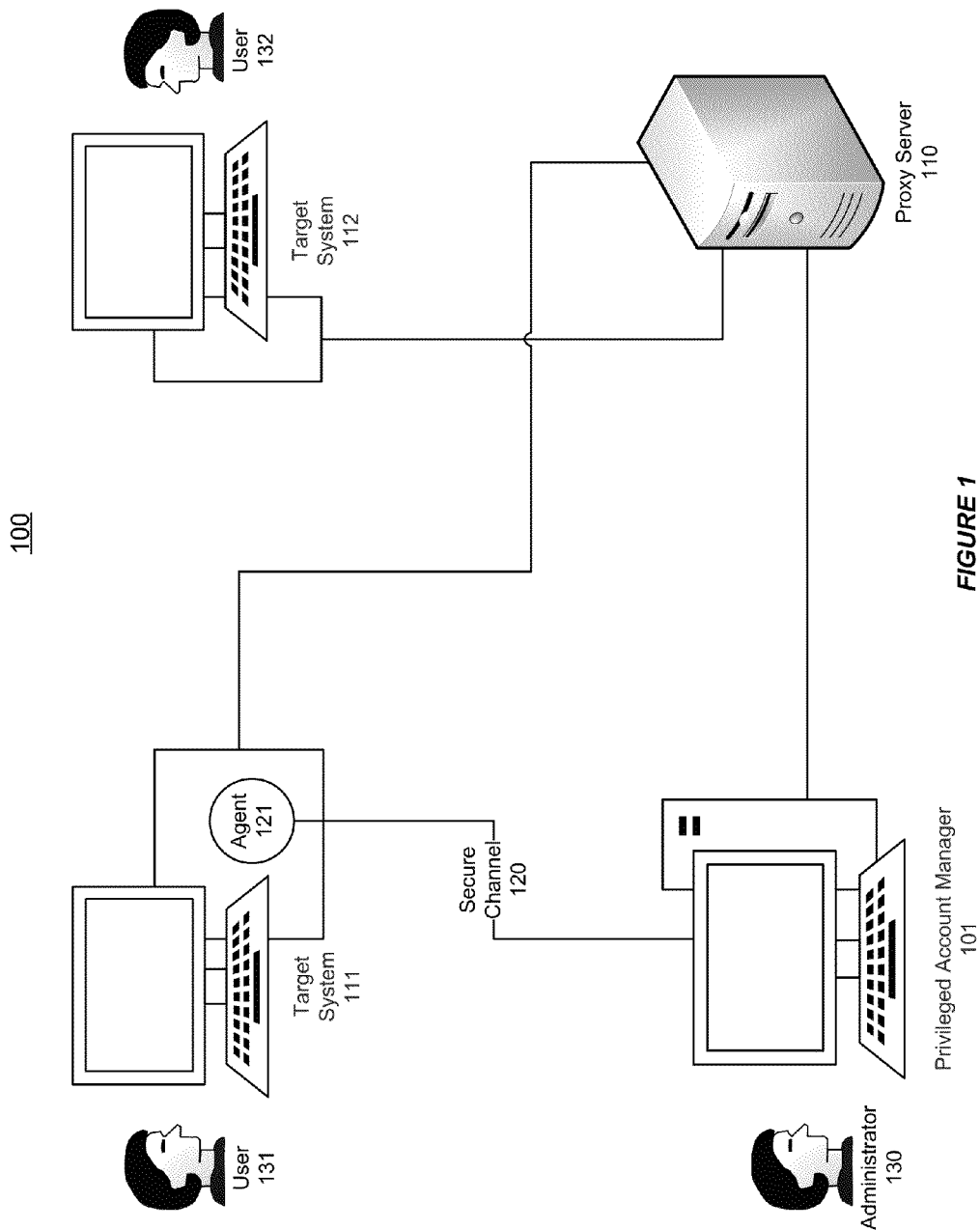
FIG. 1 shows an illustration of an account management system in a computing environment, in accordance with an embodiment of the invention.

FIG. 1 shows an illustration of an account management system in a computing environment, in accordance with an embodiment of the invention. As shown in FIG. 1, an account manager, such as a privileged account manager 101, can monitor and record user sessions (e.g. by users 131-132) on one or more target systems 111-112 in a computing environment 100.

The privileged account manager 101, e.g. an Oracle Privileged Account Manager (OPAM), is a server that is capable of managing privileged accounts and user sessions on the target systems 111-112. The privileged account, such as a root account in a UNIX system or a system account in a database system, can be shared by multiple users 131-132 and can also be role-based.

The target systems 111-112 are the remote targets, which have privileged accounts managed by the privileged account manager 101. The privileged account manager 101 can manage different types of user sessions on the target systems 111-112. For example, these user sessions can include Microsoft Windows sessions, Linux X11 sessions, virtual network computing (VNC) sessions, and Mac OS X remote desktop sessions.

As shown in FIG. 1, an agent 121 can be deployed on a target system 111 for monitoring one or more user sessions on the target system 111. The agent 121 can record user activities within a user session and communicates with the privileged account manager 101 (e.g. for obtaining screen comparison rules and sending back recorded data).

In accordance with an embodiment of the invention, the agent 121 can be physically deployed on the target system 111. The agent 121 can subscribe to a graphical user interface (GUI) rendering system, such as the windowing system, on the target system 111 to obtain various application GUI state information, such as the title of the window for the active application in the foreground. Furthermore, the agent 121 can communicate with the privileged account manager 101 using a secure channel 120, e.g. based on the secure shell (SSH)/transport layer security (TLS) protocols.

Alternatively, the privileged account manager 101 can take advantage of a proxy server 110, which can monitor and record user sessions on the target systems 111-112. For example, the proxy server 110 can be used to collect session information on the different target systems 111-112, such as textual information (e.g. the commands and key strokes) and visual information (e.g. the graphical display and windows).

In accordance with an embodiment of the invention, the use of the proxy server 110 can be beneficial, in terms of alleviating the life-cycle burden in maintaining different versions of the same software on a large number of servers, devices, and platforms, since the proxy server 110 does not rely on the agent 121 that is deployed physically on a target sytem 111.

On the other hand, the agent 121 and the proxy server 110 can monitor said one or more user sessions on the target system simultaneously. As shown in FIG. 1, the agent 121 can be deployed on a sensitive system (e.g. the target system 111), which is also monitored by the proxy server 110. Since the agent 121 is physically deployed on the target system 111, the agent 121 can closely monitor the different user actives and collect more information than the proxy server 110.

Then, an administrator 130 can connect to the privileged account manager 101 and perform various management tasks, such as view, search and audit the recorded sessions, in order to prevent inappropriate access to various account and to detect unauthorized activities.

Figure 2:
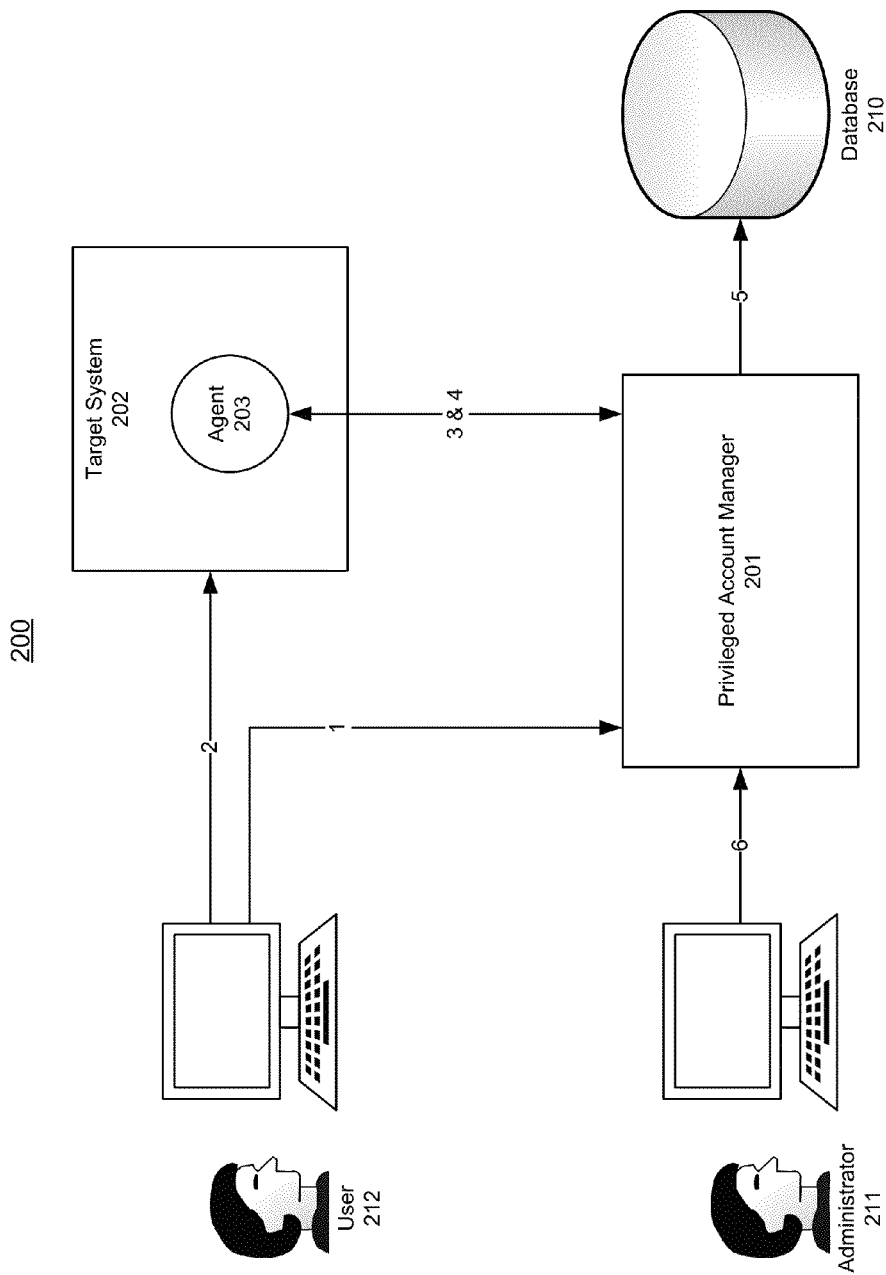
FIG. 2 shows an illustration of supporting user session monitoring in a computing environment, in accordance with an embodiment of the invention.

FIG. 2 shows an illustration of supporting user session monitoring in a computing environment, in accordance with an embodiment of the invention. As shown in FIG. 2, a privileged account manager 201, e.g. an Oracle the Oracle Privileged Account Manager (OPAM), can be used for monitoring user sessions on a target system 202.

At step 1, a user 212 can connect to the privileged account manager 201 (i.e. the server) and can send a request to the privileged account manager 201 for obtaining an access to a privileged account on the target system 202.

Upon receiving a request for accessing a privileged account from the user 201, the privileged account manager 201 can provide the user 212 with a password or a session. Then, the user 212 can access the privileged account based on the received one-time passwords or direct sessions. For example, the user 212 can obtain a session with graphical interface.

At step 2, the user 212 can connect to the target system 202 to establish a session after obtaining access to the privileged account. A user session may start as soon as a user 212 logs into the privileged account on the target system 202, using the password or session provided by the privileged account manager 201.

Additionally, the access to the privileged account may not be available after the user 212 logs out from the privileged account on the target system 202. The user session may end as soon as the user 212 logs out from the privileged account, at which time the user 212 relinquish its right to access the privileged account and another user is allowed to log in the privileged account.

At step 3, the agent 203 running on the target system 202, after detecting the establishment of a user session, can communicate with privileged account manager 201 to obtain different policies or configurations, such as the screen comparison rules.

The agent 203 can capture and record various screens on the target system 202 based on the screen comparison rules.

At step 4, the agent 203 can send the recorded data back to the privileged account manager 201 for storage.

At step 5, the privileged account manager 201 can store the recorded data in a database 210. For example, the database 210 can be an OPAM Database, which can be used for storing target information, user grants, policies and session recording data.

At step 6, the administrator 211 can connect to the privileged account manager 201 in order to view the recorded and/or ongoing sessions. The administrator 211 can review the recorded sessions, which are the completed user sessions after the user has already logged off. Also, the administrator 211 can review an ongoing session when a user is still using the session. In the case of reviewing an ongoing session, the administrator 211 may view the recording (in real time) as the session is ongoing in a fashion similar to a live record-replay (a.k.a. over the shoulder monitoring).

Visual Session Recording

Figure 3:
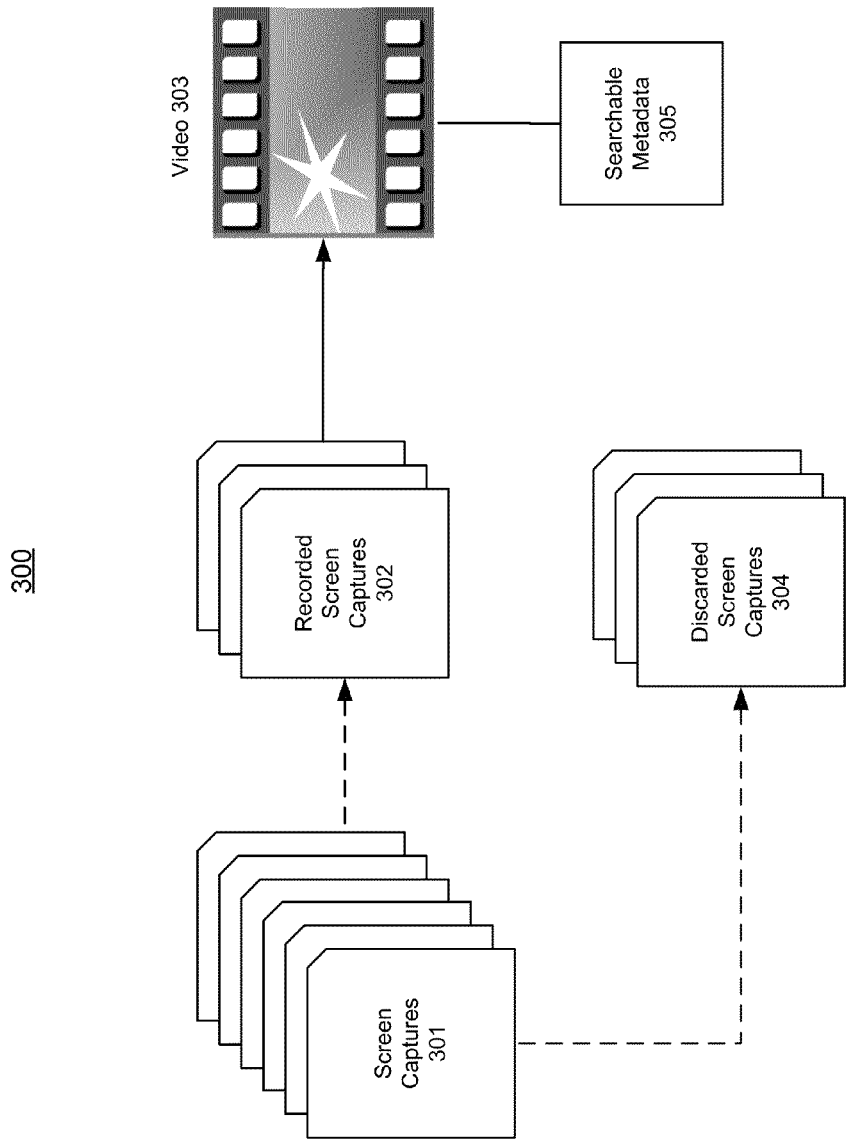
FIG. 3 shows an illustration of supporting visual session recording in a computing environment, in accordance with an embodiment of the invention.

FIG. 3 shows an illustration of supporting visual session recording in a computing environment, in accordance with an embodiment of the invention. As shown in FIG. 3, an account management system 300 can capture a number of screen captures 301 (e.g. screen shots or snapshots) on a target system, e.g. using an agent on the target system or a proxy server, during a user session.

In accordance with an embodiment of the invention, the account management system 300 can record a subset of the screen captures 301, which includes only screen captures 302 that represent significant changes during the user session, discarding the screen captures 304 that are captured when the target system is considered idle.

Thus, the account management system 300 can optimize the usage of processors, storage and network bandwidth.

Furthermore, the account management system 300 can encode the screen captures 302, which are recorded and uncompressed images, into a video 303 and stores the video 303 in a database, such as the OPAM database. The video 303 can be played back later in a fashion similar to a DVR.

Additionally, searchable textual metadata 305, which includes information about the activities, can also be recorded and provided along with the video 303. Thus, an administrator of the account management system 300 can search through the collection of recordings (e.g. the video 303) to look for activities, such as sessions which ran Internet Explorer, Control Panel etc. This provides means to monitor, audit and perform forensic analysis on the target system.

Policy Based Selective Recording

Figure 4:
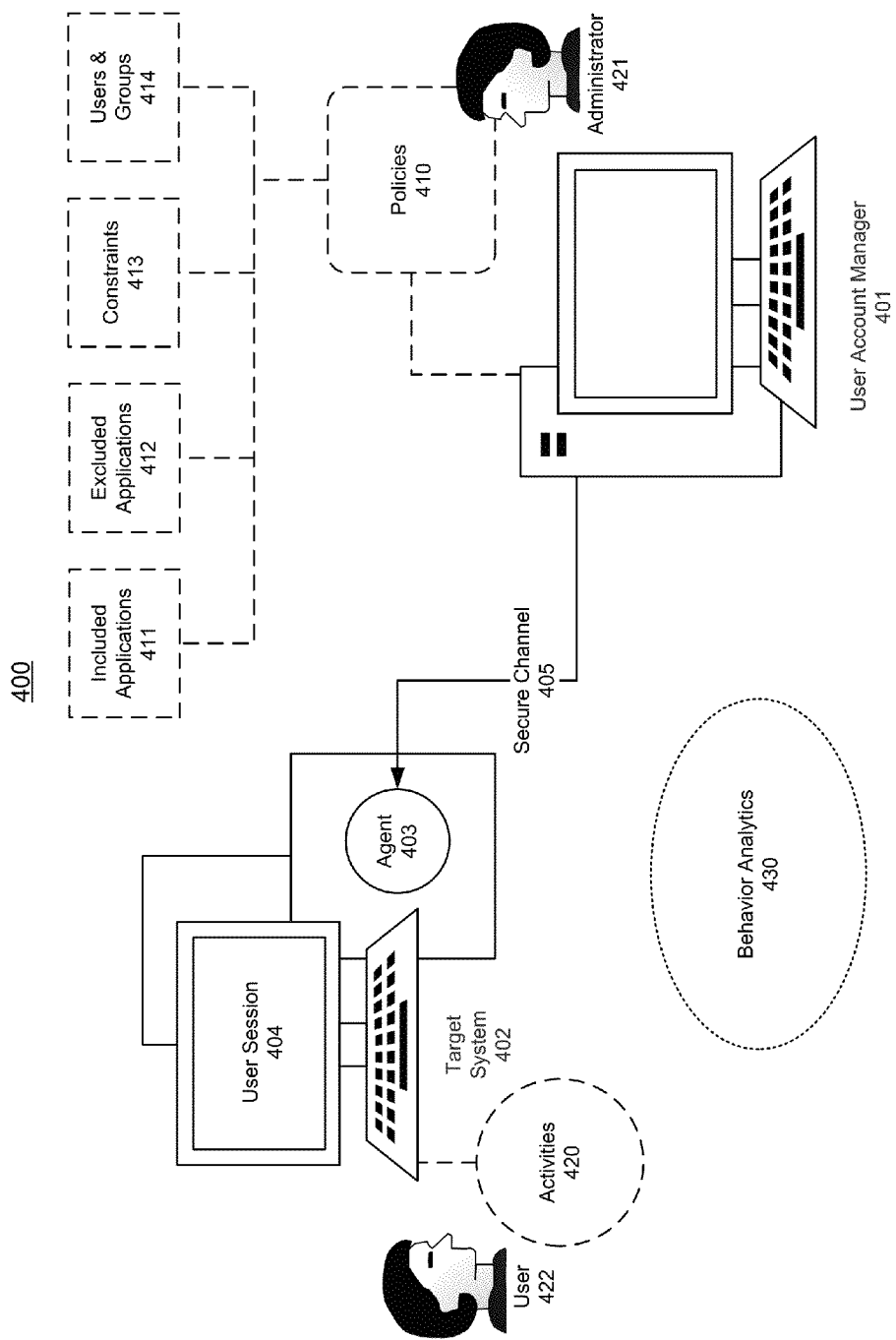
FIG. 4 shows an illustration of supporting policy based selective recording of user sessions in a computing environment, in accordance with an embodiment of the invention.

FIG. 4 shows an illustration of supporting policy based selective recording of user sessions in a computing environment, in accordance with an embodiment of the invention. As shown in FIG. 4, a user account manager 401 in an account management system 400 can use a visual session recording process, such as an agent 403 (or a process on a proxy server), to record various activities 420 in user sessions 404 on a target system 402. For example, the user account manager 401 can be, or take advantage of, a privileged account manager server (e.g. the OPAM server).

In accordance with an embodiment of the invention, a visual session recording process can be provided with various recording policies 410, which support a fine grained approach for performing the session recording.

As shown in FIG. 4, the user account manager 401 can employ one or more recording policies 410. The recording policies 410, which can be stored in a configuration file and/or a database, define detailed information on how user activities 420 on a target system 402 should be recorded. For example, the recording policies 410 can define which activities 420 should be recorded, for which users 422 and under what conditions. Also, the recording policies 410 can define various performance tuning factors, such as a frame rate, which defines how frequently the activities 420 in the user session 404 should be recorded.

Furthermore, the user account manager 410 can provide (or distribute) the recording policies 410 to the agent 403 on the target system 402. As shown in FIG. 4, the user account manager 401 can communicate with the agent 403 on the target system 402 via a secure channel 405, e.g. based on the secure shell (SSH)/transport layer security (TLS) protocols. Thus, the agent 403 on the target system 402 may record only the required session information and ignores the other unrelated session information.

In accordance with an embodiment of the invention, the distribution of the recording policies 410 can be based on a pull model. Using the pull model, the agent 403 can make a request for (and likely obtain) an update for the recording policies 410 from the user account manager 401, e.g. when the agent 403 detects the starting of a user session.

The pull model can be beneficial, especially when the user account manager 401 is responsible for monitoring a large number of target systems 402, since the pull model allows the user account manager 401 to avoid periodically pushing the recording policies 410 to a large number of visual session recording processes (such as the agent 403).

On the other hand, the user account manager 401 can push the recording policies 410 to the agent 403, when it is needed (such as when the agent 403 is initially installed or when the agent 403 has been in a dormant status for a long while). Additionally, the user account manager 401 can stop the visual recording process, when the actual duration of the visual recording process exceeds the expected duration.

In accordance with an embodiment of the invention, the recording policies 410 can be used to define various rules for performing the selective session recording. For example, the selective session recording rules can include the system recorded polices, which are provided for configuring the general system properties, and the administrator configured policies, which are provided by the administrator 421 for customizing the session recording process.

Furthermore, the administrator 421 may decide to configure, or skip, any of these selective session recording rules. The configured selective session recording rules can work with each other in combination, while the skipped selective session recording rules takes no effect on the session recoding.

In accordance with an embodiment of the invention, the recording policies 410 can specify one or more included applications 411, which are the applications that may need to be included for the session recording. A visual session recording process can perform the session recording process when at least one of the included applications is running, and can pause the session recording when none of the included applications are running.

The recording policies 410 can ensure that the visual session recording process (e.g. the agent 403) may record the user session 404 only when specified applications are running (e.g. when specific included applications, such as the Control Panel and the Windows Firewall, are open). Moreover, the agent 403 in OPAM may record only the activities 420 that are considered to be privileged actions.

Thus, the recording policies 410, which define the included applications 411, can significantly reduce the amount of recording on the target systems 402, especially when non-privileged activities (such as browsing) may be encountered more frequently than the privileged activities (such as changing firewall settings).

In accordance with an embodiment of the invention, the recording policies 410 can specify one or more excluded applications 412, which are the applications that may be excluded from the session recording. The session recording can be performed when none of the excluded applications are running. Also, the session recording process may record all session content except certain applications such as the email client, and web browser, etc.

When an excluded application is running on the targeted system 402, the excluded application may have a window displayed (fully or partially) on the screen. In such a case, the session recording process can pause the session recording. Alternatively, the session recording process can continue performing the session recording with portions of the captured screen that relate to the excluded application being blacken out (i.e. blackout exclusion).

Thus, the recording policies 410, which define the included applications 411, can be beneficial in terms of providing privacy protection to the users 422, by excluding various personal user applications while performing the required session recording on the target systems 402 at the same time.

In accordance with an embodiment of the invention, the recording policies 410 can specify one or more constraints 413. The session recording process may record various session content only when certain conditions are met in the user session 404.

As shown in FIG. 4, the constraints 413 can include a time attribute, which defines when the session recording can be performed. For example, the session recording may be performed only on certain days and/or certain time windows.

Also, the constraints 413 can include a remote address attribute, which defines which remote activities should be recorded on the target system. For example, the session recording may be performed based on the IP address of a remote connection.

Additionally, the constraints 413 can include a duration attribute, which defines for how long, or how frequently, the session recording should be performed. For example, the session recording may be performed as long as the user session 404 is running.

In accordance with an embodiment of the invention, the recording policies 410 can specify one or more users and/or groups 414. The session recording can be performed based on which user 422 is connecting to the target system 402 and also to which group the user 422 belongs.

Thus, the session recording process may record various session content based on the individual, who is accessing a shared account, in order to limit the monitoring and session recording to only a certain set of users.

For example, the OPAM server can grant a privileged account to multiple users or multiple lightweight directory access protocol (LDAP) groups of users. These users can connect to the target system 402, after gaining the access to the shared account. In one exemplary use case, when a privileged account on a target system is shared among a group of IT administrators and IT temporary contractors, the recording policies 410 (or rules) can be set up to record the user sessions only if the connected user belongs to the IT temporary contractors.

In accordance with an embodiment of the invention, the session recording of a present user session 404 on the target system 402 can be performed with additional knowledge from the behavior analytics 430.

For example, the recording policies 410 can incorporate the information gained from the behavior analytics 430, which may be based on the past user activities 420. Thus, the session recording process can take advantage of the knowledge, such as a user behavior pattern, to improve the performance of the session recording and monitoring.

Furthermore, the recording policies 410 can support dynamic frame rate for capturing various user session shots in a user session 404, e.g. based on the behavior analytics 430. For example, the session recording process can increase the frame rate, i.e. using a higher recording frequency, when a critical application (e.g. a database) is running on the target system. Also, the session recording process can increase the frame rate, when the user 422 inputs a suspicious command (e.g. a delete-all command).

Additionally, the session recording process can increase the frame rate when it determines that an activity on the target system is suspicious, e.g. when an application is launched at an odd time or from a suspicious IP remote address. On the other hand, the session recording process can decrease the frame rate, when the available network bandwidth is low.

In accordance with an embodiment of the invention, the user account manager 401 can take over the control of the target system 402, when it is needed. For example, the user account manager 401 can prevent the suspicious application from being launched and the user account manager 401 can block the malicious operations, in real time, before the target system 402 is damaged or affected.

Thus, the policy based selective recording can reduce the amount of information that needs to be maintained for audit and can make the finding of information easier. Also, the policy based selective recording can protect user privacy without compromising the auditing need. Additionally, the policy based selective recording can meet the different recording needs by multiple users accessing a shared account.

Figure 5:
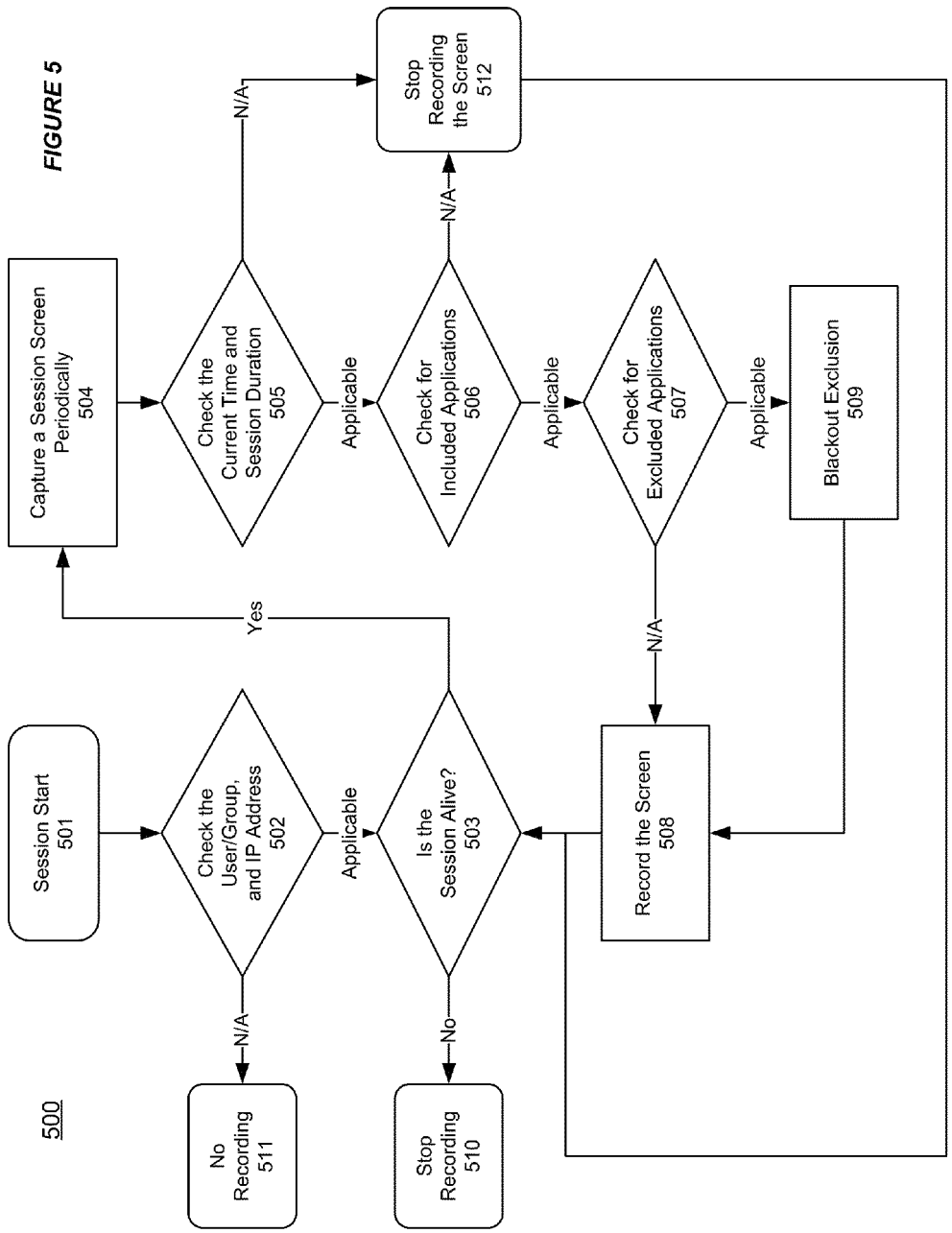
FIG. 5 shows an illustration of a visual session recording process in a computing environment, in accordance with an embodiment of the invention.

FIG. 5 shows an illustration of a visual session recording process in a computing environment, in accordance with an embodiment of the invention. As shown in FIG. 5, a visual session recording process 500, such as an agent on a target system or a process on a proxy server, can perform session recording on a target system.

At step 501, the visual session recording process 500 can detect the start of a user session, e.g. when a user first logs into an account. Then, at step 502, the visual session recording process can check the user/group information, as well as the IP address, in order to determine whether the user session should be recorded.

At step 511, the visual session recording process 500 may determine not to record the user session, if the user session does not satisfy the conditions (or constraints). Otherwise, at step 503, the visual session recording process 500 can start the recording process by checking whether the user session is still alive.

At step 510, if the user session is not alive, then the visual session recording process 500 can stop recording.

If the user session is alive, at step 504, the visual session recording process can capture a session screen periodically, e.g. one frame every one hundred (100) milliseconds.

For each captured session screen, at step 505, the visual session recording process 500 can check the current time and session duration to determine whether the captured screen should be recorded, e.g. in order to optimize the performance of the visual session recording. At step 512, the visual session recording process 500 may determine that the captured screen should not be recorded.

At step 506, the visual session recording process 500 can check whether any included application, as specified in the received recoding policies or rules, is active. At step 512, the visual session recording process may determine that the captured screen should not be recorded, if no included applications are active (e.g. when the application in the foreground is not an included application).

At step 507, the visual session recording process 500 can check whether any excluded application, as specified in the received recoding policies or rules, is running. At step 508, the visual session recording process 500 can record the captured screen, if no excluded applications are running. Otherwise, at step 509, the visual session recording process 500 may perform blackout exclusion on the captured screen before recording the screen.

Then, at step 503, the visual session recording process 500 can make sure that the user session is still alive before processing to capture another session screen.

Figure 6:
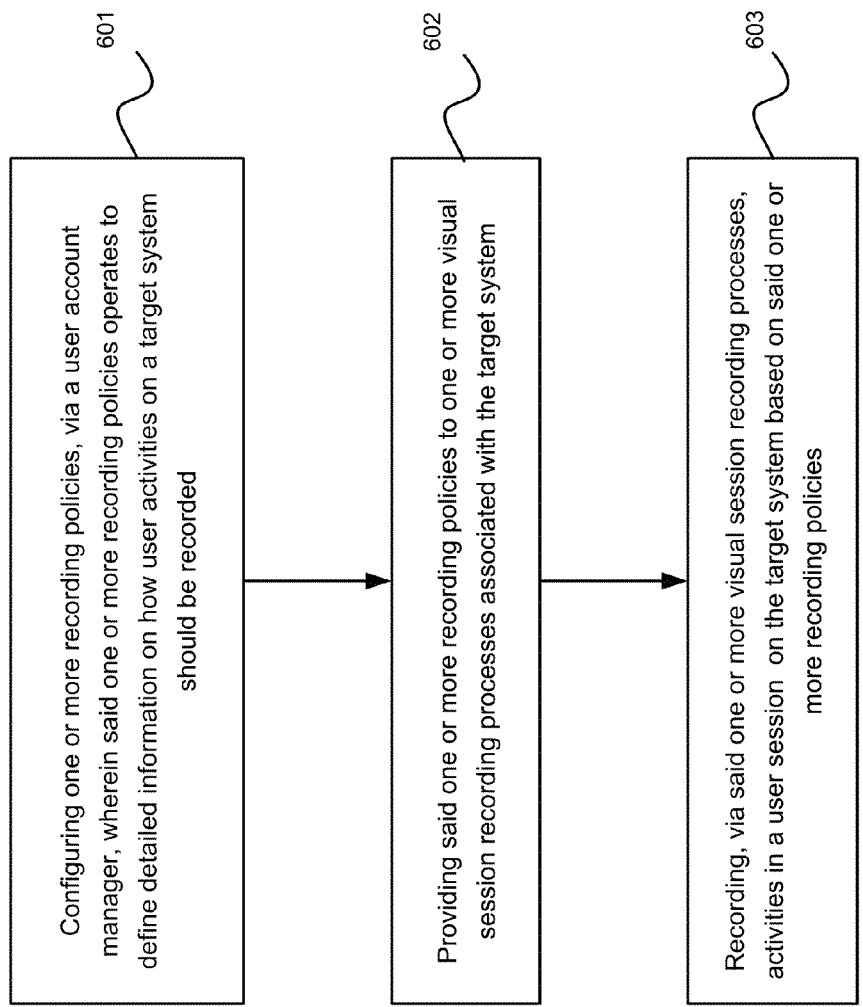
FIG. 6 illustrates an exemplary flow chart for supporting policy based selective recording of user sessions in a computing environment, in accordance with an embodiment of the invention.

FIG. 6 illustrates an exemplary flow chart for supporting policy based selective recording of user sessions in a computing environment, in accordance with an embodiment of the invention. As shown in FIG. 6, at step 601, a user account manager can configure one or more recording policies, wherein said one or more recording policies operates to define detailed information on how user activities on a target system should be recorded. Furthermore, at step 602, the user account manager can provide said one or more recording policies to one or more visual session recording processes on the target system. Then, at step 603, the user account manager can use said one or more visual session recording processes to record activities in a user session on the target system based on said one or more recording policies.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting privileged account management in a computing environment comprising a privileged account manager server and a target system wherein a plurality of users share access to a privileged account on the target system, the method comprising:
providing a privileged account manager operating on the privileged account manager server;
providing a recording agent operating on the target system;
configuring one or more recording policies, using the privileged account manager, wherein said one or more recording policies operates to define detailed information on how user activities on the target system should be recorded;
wherein configuring said one or more recording policies is performed using behavior analytics information that indicates when a suspicious command is input based on past user activities;
receiving at the privileged account manager a request to access said privileged account on the target system from a particular user of the plurality of users which share access to a privileged account on the target system;
providing said particular user with one-time access to a privileged account session for said privileged account on the target system in response to said request wherein said one-time access is terminated when said privileged account session is ended;
detecting establishment of said privileged account session for said privileged account on the target system with the recording agent;
providing said one or more recording policies from the privileged account manager to the recording agent on the target system in response to detecting establishment of said privileged account session;
capturing with the recording agent a plurality of user session screens associated with said privileged account session to create a visual session record of activities of the particular user during the privileged account session on the target system in accordance with said one or more recording policies; and
transmitting the visual session record from the recording agent to the privileged account manager.

2. The method according to claim 1, wherein said recording agent on the target system uses a secure channel to communicate with the privileged account manager.

3. The method according to claim 1, wherein said one or more recording policies to include at least one of a system recorded policy and an administrator configured policy.

4. The method according to claim 1, further comprising:
requesting, via said recording agent, an update for said one or more recording policies from the privileged account manager in response to said detecting establishment of said privileged account session.

5. The method according to claim 1, wherein said one or more recording policies to specify one or more included applications, and wherein said recording agent performs steps comprising:
starting capturing the plurality of user session screens when at least one of the included applications is running on said target system in said privileged account session; and
pausing from capturing the plurality of user session screens when none of the included applications is running on said target system in said privileged account session.

6. The method according to claim 1, further wherein said one or more recording policies to specify one or more excluded applications, and wherein said recording agent performs steps comprising:
avoiding recording session content associated with said one or more excluded applications.

7. The method according to claim 1, further wherein said one or more recording policies to specify one or more constraints, and wherein said recording agent performs steps comprising:
avoiding recording session content if said one or more constraints are not satisfied.

8. The method according to claim 1, further wherein said one or more recording policies to specify one or more users and groups, and wherein said recording agent performs steps comprising:
recording session content based on an individual accessing of said privileged account by said one or more users and groups.

9. The method according to claim 1, wherein:
said capturing with the recording agent the plurality of user session screens associated with said privileged account session comprises capturing the plurality of user session screens at a predetermined interval as defined by the one or more recording policies.

10. The method according to claim 9, wherein:
said capturing with the recording agent the plurality of user session screens associated with said privileged account session comprises capturing the plurality of user session screens using a dynamic frame rate supported by said one or more recording policies.

11. The method according to claim 9, wherein:
said capturing with the recording agent a plurality of user session screens associated with said privileged account session to create a visual session record of activities of the particular user comprises encoding the plurality of recorded user session screens into a video, wherein the video is associated with a searchable metadata and is stored in a database associated with the privileged account manager server.

12. The method according to claim 11, further comprising:
allowing an administrator to replay the video stored in the database for monitoring said privileged account session.

13. A system for supporting privileged account management in a computing environment, the system comprising:
a privileged account manager server comprising one or more microprocessors;
a target system comprising one or more microprocessors;
a privileged account on the target system wherein the privileged account is shared by a plurality of users;
a recording agent associated with the target system;
a privileged account manager, running on said privileged account manager server, wherein said privileged account manager is configured to
configure one or more recording policies, wherein said one or more recording policies define detailed information on how user activities on the target system should be recorded, and wherein said one or more policies are configured using behavior analytics information that indicates when a suspicious command is input based on past user activities, receive a request to access said privileged account on the target system from a particular user of the plurality of users which share access to a privileged account on the target system, provide said particular user with one-time access to a privileged account session for said privileged account on the target system in response to said request wherein said one-time access is terminated when said privileged account session is ended, and provide said one or more recording policies to said recording agent associated with the target system; and wherein said recording agent is configured to detect establishment of said privileged account session for said privileged account on the target system, receive said one or more recording policies from the privileged account manager in response to detecting establishment of said privileged account session, capture a plurality of user session screens associated with said privileged account session to create a visual session record of activities of the particular user during the privileged account session on the target system in accordance with said one or more recording policies, and transmit the visual session record from the recording agent to the privileged account manager.

14. The system according to claim 13, wherein said recording agent comprises at least one of an agent on the target system which use a secure channel to communicate with the user account manager and a proxy server.

15. The system according to claim 13, wherein:
said one or more recording policies includes at least one of a system recorded policy and an administrator configured policy.

16. The system according to claim 13, wherein:
said recording agent is configured to request an update for said one or more recording policies from the privileged account manager in response to detecting establishment of said privileged account session for said privileged account on the target system.

17. The system according to claim 13, wherein:
said one or more recording policies specify one or more included applications, and wherein said recording agent is configured to start capturing the plurality of user session screens associated with said privileged account session when at least one of the included applications specified in said one or more recording policies is running, and pause from capturing the plurality of user session screens associated with said privileged account session when none of the included applications specified in said one or more recording policies is running.

18. The system according to claim 13, wherein:
said one or more recording policies specify one or more excluded applications, and wherein said recording agent is configured to avoid recording session content that is associated with said one or more excluded applications.

19. The system according to claim 13, wherein:
said one or more recording policies specify one or more constraints, and wherein said recording agent is configured to avoid recording session content if said one or more constraints specified in said one or more recording policies are not satisfied.

20. The system according to claim 13, wherein:
said one or more recording policies specify one or more users and groups, and wherein said recording agent is configured to record session content based on an individual accessing of a shared account by said one or more users and groups specified in said one or more recording policies.

21. The system according to claim 13, wherein:
said recording agent is configured to capture the plurality of user session screens at a predetermined interval as defined by the one or more recording policies.

22. The system according to claim 13, wherein:
said recording agent is configured to capture the plurality of user session screens at a dynamic frame rate as specified in said one or more recording policies.

23. The system according to claim 21, wherein:
said recording agent is configured to encode the plurality of captured user session screens into a video, wherein the video is associated with a searchable metadata and is stored in a database associated with the privileged account manager server; and wherein the privileged account manager is configured to replay the video stored in the database to an administrator for monitoring said privileged account session.

24. A non-transitory machine readable storage medium having instructions stored thereon for supporting privileged account management in a computing environment comprising a privileged account manager server and a target system wherein a plurality of users share access to a privileged account on the target system, which instructions, when executed cause the computing environment to perform steps comprising:

providing a privileged account manager operating on the privileged account manager server;

providing a recording agent operating on the target system;

configuring one or more recording policies, using the privileged account manager, wherein said one or more recording policies operates to define detailed information on how user activities on the target system should be recorded;

wherein configuring said one or more recording policies is performed using behavior analytics information that indicates when a suspicious command is input based on past user activities;

receiving at the privileged account manager a request to access said privileged account on the target system from a particular user of the plurality of users which share access to a privileged account on the target system;

providing said particular user with one-time access to a privileged account session for said privileged account on the target system in response to said request wherein said one-time access is terminated when said privileged account session is ended;

detecting establishment of said privileged account session for said privileged account on the target system with the recording agent;

providing said one or more recording policies from the privileged account manager to the recording agent on the target system in response to detecting establishment of said privileged account session;

capturing with the recording agent a plurality of user session screens associated with said privileged account session to create a visual session record of activities of the particular user during the privileged account session on the target system in accordance with said one or more recording policies; and transmitting the visual session record from the recording agent to the privileged account manager.

25. A method for supporting privileged account management in a computing environment comprising a privileged account manager server and a target system wherein a plurality of users share access to a privileged account on the target system, the method comprising:
- providing a privileged account manager operating on the privileged account manager server;
- providing a recording agent associated with the target system;
- configuring one or more recording policies, using the privileged account manager, wherein said one or more recording policies operates to define detailed information on how user activities on the target system should be recorded;
- wherein configuring said one or more recording policies is performed using behavior analytics information that indicates when a suspicious command is input based on past user activities;
- receiving at the privileged account manager a request to access said privileged account on the target system from a particular user of the plurality of users which share access to a privileged account on the target system;
- providing said particular user with one-time access to a privileged account session for said privileged account on the target system in response to said request wherein said one-time access is terminated when said privileged account session is ended;
- detecting establishment of said privileged account session for said privileged account on the target system with the recording agent;
- providing said one or more recording policies from the privileged account manager to the recording agent on the target system in response to detecting establishment of said privileged account session;
- capturing with the recording agent a plurality of user session screens associated with said privileged account session to create a visual session record of activities of the particular user during the privileged account session on the target system in accordance with said one or more recording policies;
- encoding the plurality of recorded user session screens into a video associated with a searchable metadata; and
- storing the video in a database associated with the privileged account manager server.

26. The method according to claim 25, further comprising:
- using a pull model to provide one or more updates for said one or more recording policies to said recording agent from the privileged account manager; and
- using a push model to provide an update for said one or more recording policies to said recording agent from the privileged account manager, when said one or more visual session recording processes are initially deployed and after said recording agent has been in a dormant status.

* * * * *

UNITED STATES PATENT AND TRADEMARK OFFICE
CERTIFICATE OF CORRECTION

| | | |
|---|---|---|
| PATENT NO. | : 9,167,047 B1 | Page 1 of 2 |
| APPLICATION NO. | : 14/494732 | |
| DATED | : October 20, 2015 | |
| INVENTOR(S) | : Sharma et al. | |

It is certified that error appears in the above-identified patent and that said Letters Patent is hereby corrected as shown below:

On Title Page 2, column 2, item (56), under other publications, line 66, delete "retreived" and insert -- retrieved --, therefor.

In the Specification

In column 1, line 6, Below "ENVIRONMENT" insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 1, line 21, delete "PROCESING" and insert -- PROCESSING --, therefor.

In column 1, lines 30-39, delete "COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.".

In column 3, line 26, delete "sytem" and insert -- system --, therefor.

In the Claims

In column 9, line 53, in claim 3, after "policies" delete "to".

In column 9, line 61, in claim 5, after "policies" delete "to".

In column 10, line 5, in claim 6, after "policies" delete "to".

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,167,047 B1

In column 10, line 11, in claim 7, after "policies" delete "to".

In column 10, line 18, in claim 8, after "policies" delete "to".

In column 11, line 29, in claim 14, delete "use" and insert -- uses --, therefor.

In column 12, line 6, in claim 21, after "interval" delete "as".